United States Patent [19]
Morris

[11] 3,967,178
[45] June 29, 1976

[54] WIDE BAND ANGULAR DISPLACEMENT AND VELOCITY SENSOR AND METHOD

[75] Inventor: Harold D. Morris, Orinda, Calif.

[73] Assignee: Systron Donner Corporation, Concord, Calif.

[22] Filed: July 15, 1974

[21] Appl. No.: 488,784

Related U.S. Application Data

[63] Continuation-in-part of Ser. No. 352,889, April 20, 1973, abandoned.

[52] U.S. Cl. .............................. 318/648; 318/652; 73/505
[51] Int. Cl.² .................. G01P 15/00; B64C 17/02
[58] Field of Search ...... 73/490, 503, 505, 516 LM, 73/516 R, 517 A, 517 B, 510; 318/648, 649, 651, 584

[56] References Cited
UNITED STATES PATENTS

| | | | |
|---|---|---|---|
| 2,853,287 | 9/1958 | Draper et al. | 73/516 R |
| 3,052,127 | 9/1962 | Mott | 73/517 A |
| 3,479,886 | 11/1969 | Canfield | 73/516 LM |
| 3,507,158 | 4/1970 | Wilcox | 73/517 B |
| 3,520,196 | 7/1970 | Morris et al. | 73/516 LM |

*Primary Examiner*—Robert K. Schaefer
*Assistant Examiner*—John J. Feldhaus
*Attorney, Agent, or Firm*—Flehr, Hohbach, Test, Albritton & Herbert

[57] ABSTRACT

An angular displacement transducer having a mounting base for mounting an inertial element sensitive to low frequency angular displacements and an inertial element sensitive to high frequency angular displacements. The low frequency sensitive inertial mass is a solid rotor device having a pickoff for sensing angular displacement between the solid inertial mass and the mounting base. A feedback centering circuit responsive to the pickoff output maintains the solid inertial mass in a substantially neutral position relative to the mounting base for displacement frequencies below the band of interest and allows the solid mass to move in an open loop fashion within its band of interest. The inertial mass sensitive to high frequency angular displacements is a fluid mass having a pickoff for sensing displacement of the mounting base relative to the fluid mass. A feedback centering circuit responsive to the fluid mass displacement sensor output is disposed to impart the motion of the mounting base to the fluid mass for displacement frequencies below the band of interest and allows the fluid mass to operate open loop within its band of interest. The solid inertial mass pickoff output is directed to a low pass filter and the fluid inertial mass pickoff output is directed to a high pass filter. The response time of the feedback centering circuit for the solid inertial mass is long enough in the band of interest to produce pickoff output related to angular displacement in the low frequency range and the response time of the feedback centering circuit for the fluid inertial mass, while shorter, is long enough in the band of interest to produce pickoff output related to angular displacement in the high frequency range. The outputs from the high and low pass filters are summed and presented as angular displacement sensor output over the wide band of high and low frequencies. Adjustment of feedback centering circuit gain and viscosity of fluid inertial mass viscosity may provide a wide band angular velocity sensor.

30 Claims, 11 Drawing Figures

FIG. 4
(OLD ART)

WIDE BAND ANGULAR DISPLACEMENT AND VELOCITY SENSOR AND METHOD

CROSS REFERENCES

This is a continuation in part application of co-pending application Ser. No. 352,889, now abandoned filed Apr. 20, 1973.

BACKGROUND OF THE INVENTION

This invention relates to a wide band angular motion sensor which serves to provide an output voltage related to angular motion of the instrument support base about a sensitive axis. More particularly the angular motion sensor is used to monitor or control small angular displacements or velocities over the wide band of frequencies.

Heretofore small angular displacements have been detected for monitoring or control purposes, but only over relatively narrow bandwidths. This has proved to be a disadvantage in applications such as monotoring earth's motion in seismological studies where small angular displacements occur over a wide bandwidth. Moreover there is a need to discriminate between translational motion and angular motion of the earth during seismic disturbances in interpreting collected data. Control systems required to sense and control small angular deviations must inherently be capable of providing flat phase and amplitude response over a wide frequency spectrum. Linear second order mechanical systems functioning in the low frequency ranges do not have the capability of error free response at higher frequencies generally. Secondary vibration modes and appreciable phase angle error characteristically cause degraded performance at higher input frequencies. Sensors capable of low frequency operation also characteristically have marginal structural features and are susceptible to error torques. There is therefore a need for a wide band angular motion sensor which introduces minimal amplitude and phase error in both anguar displacement and velocity monitoring and control applications.

SUMMARY AND OBJECTS OF THE INVENTION

In accordance with the present invention there is provided an angular displacement and angular velocity transducer which has a support base with an external sensitive axis reference. The base may support a solid inertial element and a fluid inertial element both movable relative to the base about the sensitive axis. Both the solid and the fluid inertial elements have pickoffs disposed to monitor motion between the inertial elements and the base for providing output signals which are directed to respective pickoff centering feedback circuits for urging the inertial elements toward a substantially neutral position relative to the base. A torsional spring supports the solid inertial element. Means providing a negative spring and thus reducing the frequency of resonance of the solid inertial element on the spring support are installed. The pickoff centering feedback circuits are purposely constructed with a long characteristic time in the angular displacement frequency bands of interest. The solid inertial element pickoff output is connected to a low pass filter and the fluid inertial element pickoff output is connected to a high pass filter having high and low cutoff frequencies respectively which provide an electronic crossover which is above the point where there are residual aberrations in the fluid mass response and below the point where there are harmonic resonances occurring in the solid mass response. The filter outputs are summed to form the angular displacement sensor output signal over the entire low and frequency bandwith.

In general it is an object of the present invention to provide an angular motion transducer of the above character which will provide accurate motion indication output signals over a frequency bandwidth beyond the capabilities of an ordinary spring-mass system transducer.

It is another object of the present invention to provide an angular displacement transducer of the above character which is capable of monitoring and controlling angular displacements from several microradians to plus or minus one degree while providing normal full scale DC outputs.

It is another object of the present invention to provide an angular displacement transducer of the above character which may be used in control systems over a wide bandwidth without introduction of unacceptable phase error.

It is another object of the present invention to provide an angular velocity transducer with adjustable accurate wideband output signal response to angular velocity inputs.

It is another object of the present invention to provide an angular displacement transducer with strong structural features and low frequency angular displacement sensing capability.

Another object of the present invention is to provide an angular displacement transducer which produces an output substantially free of amplitude error for high frequency angular displacement inputs.

Additional objects and features of the invention will appear from the following description in which the preferred embodiment has been set forth in detail in conjunction with the accompanying drawings.

DESCRIPTION OF THE PREFERRED EMBODIMENTS

Figure 1:
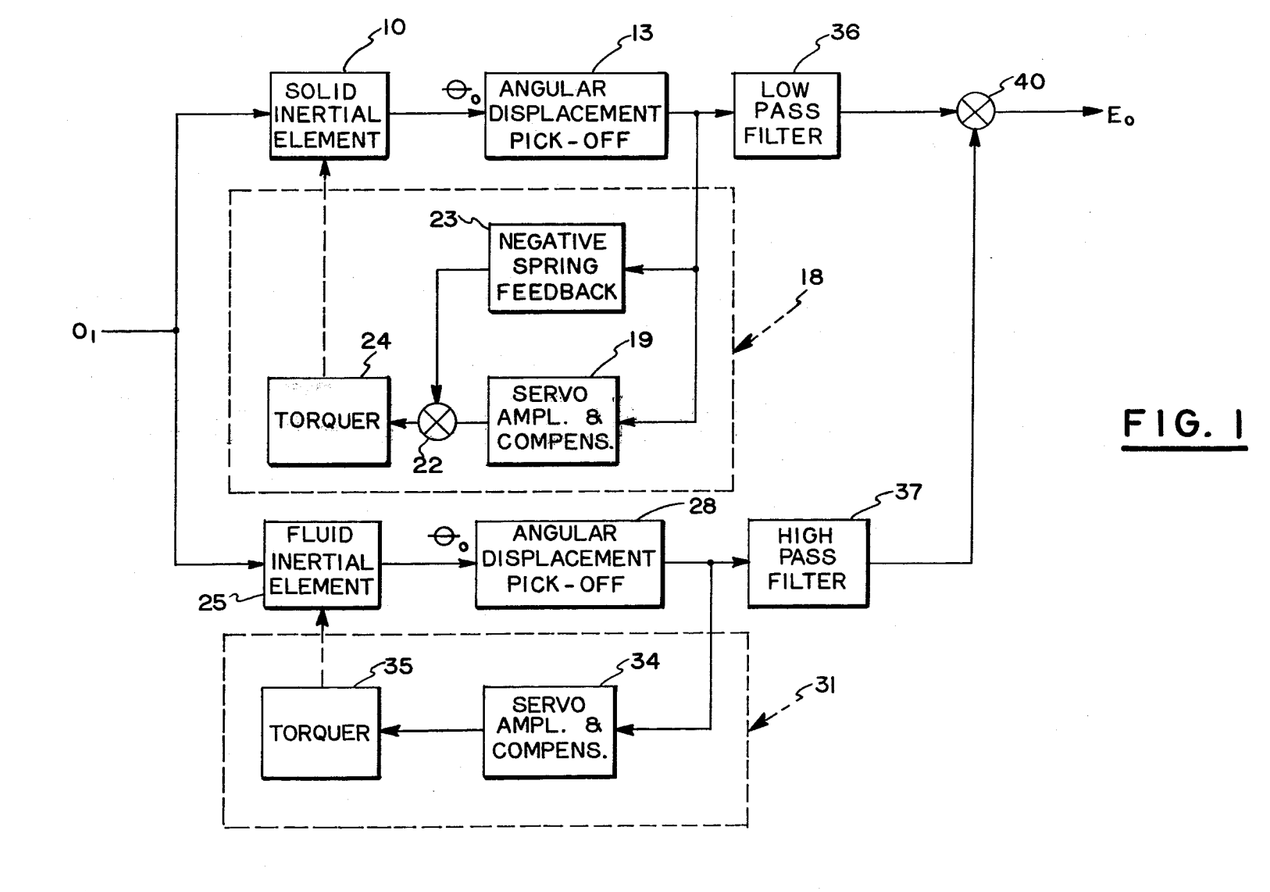
FIG. 1 is a block diagram of the wideband angular displacemen transducer

The sensing assembly shown in block diagram form in FIG. 1 is for measuring angular displacements of small magnitude. The transducer in this embodiment contains two inertial masses which are supported in a base and mechanically configured as angular accelerometers with parallel sensitive axes. The two acceleration sensitive devices represent substantially linear second order systems and are designed to roll off as acceleration sensors at some point in the input frequency spectrum below the spectrum of interest as angular displacement sensors. A solid inertial element 10 is supported on a friction free pivot such as flexural spring support 11, seen in detail in FIG. 4, which is disposed between solid inertial element 10 and a support base 12. An angular displacement pickoff 13 has a movable element 16 attached to solid inertial element 10 and a stationary portion 17 mounted on support base 12. Output from angular displacement pickoff 13 is directed to a pickoff centering feedback means 18 for solid inertial element 10. The pickoff centering feedback means 18 contains a servo amplifier 19 and electrical components for determining the characteristic time of the feedback means 18. The output of servo amplifier 19 is directed to a summing point 22 which may also receive a portion of the output from pickoff 13 which is determined by a negative spring feedback element 23. The output from summing point 22 is directed to torquer 24 which mechanically positions solid inertial element 10 relative to support base 12.

Angular displacement input $\theta_i$ is also detected by a fluid inertial element 25. Fluid inertial element 25 is disposed about an axis parallel to the sensitive axis of solid inertial element 10. An angular displacement pickoff 28 has a movable element 29 in communication with fluid inertial element 25 and a stationary portion 30 mounted integrally with support base 12. The output of angular displacement pickoff 28 is directed to pickoff centering feedback means 31 which contains a servo amplifier 34 and circuit components for determining the characteristic time of the centering feedback circuit 31. The output of servo amplifier 34 is directed to a torque 35 which applies torque to a member which is in mechanical engagement with fluid inertial element 25.

The outputs from angular displacement pickoffs 13 and 28 are directed to a low pass filter 36 and a high pass filter 37, respectively. The outputs from the low pass filter 36 and high pass filter 37 are brought to a summing point 40 which produces the output related to angular displacement $E_O$.

Figures 2, 3, 4:
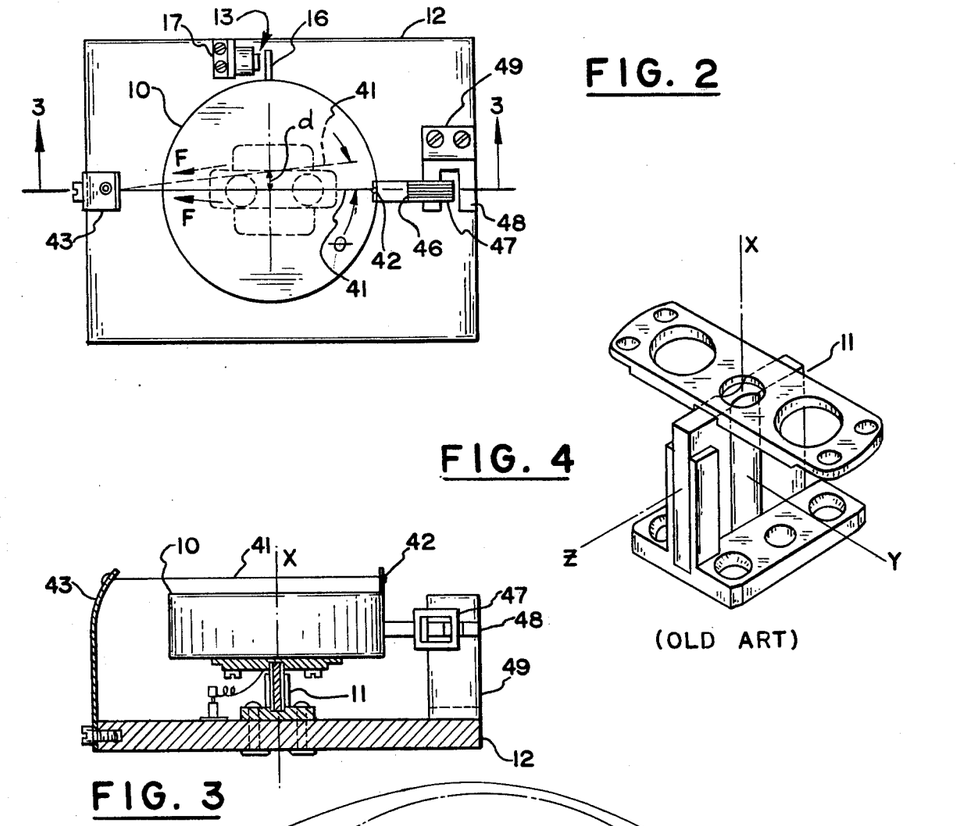
FIG. 2 is a plan view of the solid inertial element angular displacement sensor.
FIG. 3 is a sectional view of the solid inertial element angular displacement transducer taken along the line 3—3 of FIG. 2.
FIG. 4 is an isometric view of a flexure spring pivot.

Referring to FIG. 2 a taut wire 41 is shown stretched between a tab 42 on a solid inertial element 10 and a spring support 43 attached to support base 12. Solid inertial element 10 also has attached a torquer coil 46 wound on a bobbin 47 which is disposed in a magnetic field provided by a magnet 48. Magnet 48 is mounted by suitable means such as bracket 49 to support base 12.

Figure 5:
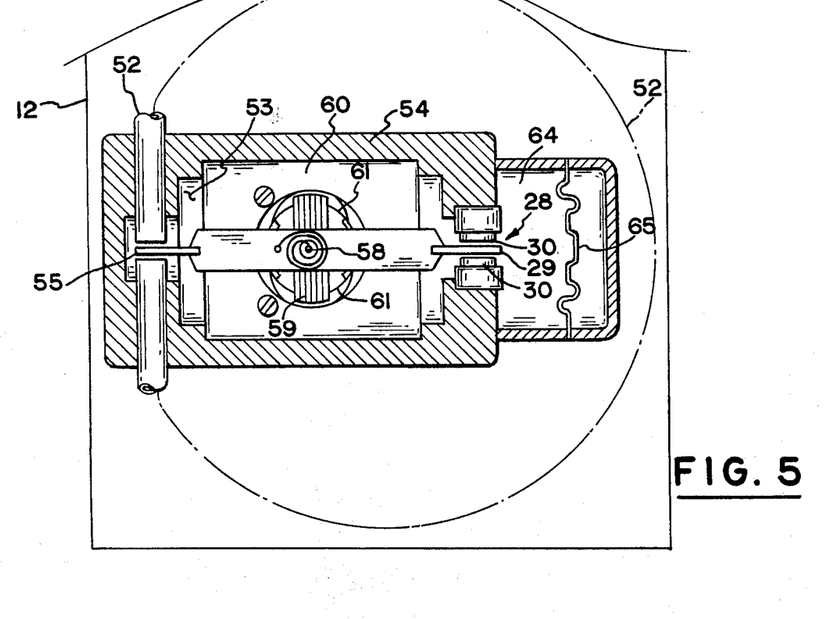
FIG. 5 is a sectional plan view of the fluid inertial element angular displacement transducer.

Fluid inertial element 25 is disposed in path 52 as best seen in FIG. 5. Fluid of the same type as that forming inertial element 25 is disposed at 53 in a case 54. A paddle 55 attached to the movable element 29 in angular displacement pickoff 28 is disposed in the path 52 and describes angular motion about pivot point 58. Pivot point 58 is also used to transfer electrical power from the support base 12 to a torquer coil 59 attached to paddle 55 and disposed in a magnetic field provided by a magnet 61 and pole pieces 60. An expansion chamber 64 having a diaphragm 65 disposed therein is provided for expansion and contraction of fluid 53 with change in temperature.

The angular displacement tranducer structurally described above operates to provide an output signal, $E_O$, related to angular input $\theta_1$, in the following manner. Solid inertial element 10 forms a rotational spring mass system with flexural spring pivot 11. An undamped frequency of resonance exists determined by the relationship $$f_n = \frac{1}{2\pi} \sqrt{\frac{K_t}{J}}.$$

For practical structural support characteristics provided by flexural spring support 11 the torsional spring constant $K_t$ must be of some substantial finite value. The spring inertia system defined by inertial element 10 and flexural spring pivot 11 is altered by the effect of the force F as indicated in FIG. 2 provided in the taut wire 41. When solid inertial element 10 is in a neutral position relative to support base 12, taut wire 41 passes over the center of rotation of inertial element 10 on a flexural spring pivot 11. As soon as inertial element 10 rotates through some finite angle $\theta$, exaggerated here for clarity, force F is displaced from the center of rotation of inertial element 10 by a distance d. Force F is substantially equivalent to the quantity F cos $\theta$ for small values of $\theta$. Considering the return torques exerted upon inertial element 10 by flexural spring pivot 11 to be positive, a negative torque having a value of Fd arises when inertial element 10 is displaced from the neutral position. Theoretically Fd may be made equivalent to $K_t\theta$. As a practical fact this equivalency may not be exactly achieved. By way of example, in adjusting force F the quantity Fd may be adjusted to achieve a magnitude of approximately 99 percent of the return torque $K_t\theta$. In the pickoff centering feedback means 18 an electronic trim in the form of a resistive element may be connected as negative spring feedback element 23 to direct a portion of the output from angular displacement pickoff 13 to the torquer 24 providing a small negative torque T. Thus negative spring feedback element 23 is typically a positive electrical feedback element. The negative spring feedback element 23 may be adjusted by trimming the resistive element to deliver the proper signal portion to summing point 22 for combination with the output of servo amplifier 19 to achieve substantially 100 percent negative spring torque relative to the positive return torque from pivot 11. The substantially 100 percent negative spring torque may be obtained by combining adjustment of spring feedback element 23 with the negative torsional spring force Fd.

Solid inertial element 10 together with spring pivot 11, taut wire 41 and negative spring feedback element 23 may be seen to provide a frictionless support for a rotating mass with a substantial polar moment of inertia J and a minimal spring constant K as seen in the following progression of relationships:

$$f_n = \frac{1}{2\pi} \sqrt{\frac{K}{J}}$$

$$K = \frac{K_t\theta - Fd - T}{\theta}$$

-continued $$\tau = K_t\theta$$

$$-\tau_1 = Fd + T$$

$$\tau_t = \tau - \tau_1$$

If $K_t\theta = Fd + T$ then $\tau = \tau_1$ and $K = 0$. From these relationships it may be seen that there is a supported, friction free solid inertial element 10 with an extremely low rotational resonant frequency due to the fact that the quantity K approaches O.

Figure 6:
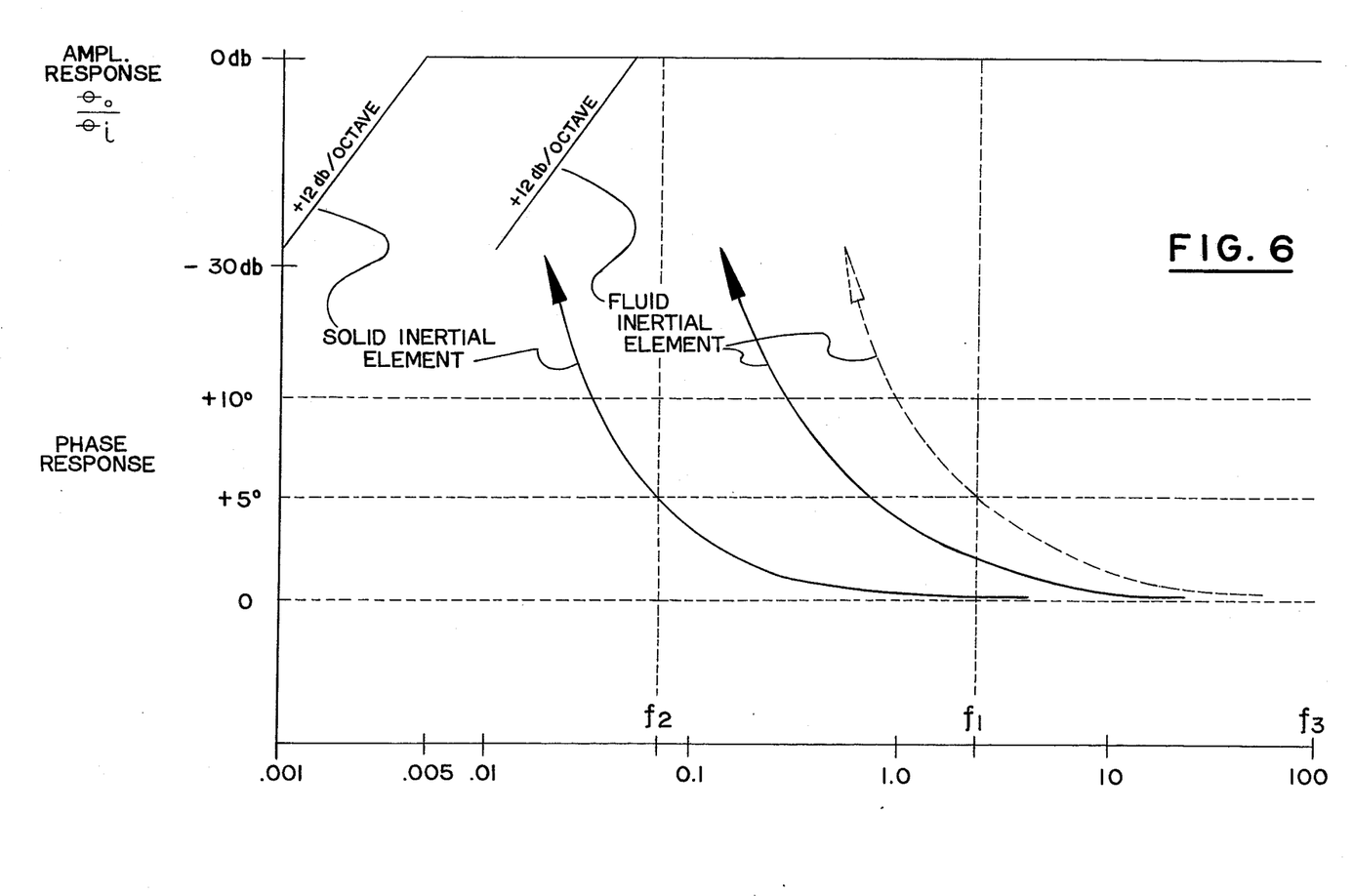
FIG. 6 is a plot of curves for solid and fluid inertial element angular displacement sensor showing amplitude and phase response.

Such a mechanical configuration is not useful unless some force urges the inertial mass 10 toward a neutral position for steady state torques applied to mass 10. Otherwise the output from pickoff 13 would be saturated in either the plus or the minus direction by error torques even in the absence of angular displacement inputs. Torquer coil 46 disposed in the field provided by magnet 48 receives the output from angular displacement pickoff 13 through pickoff centering feedback means 18 to provide the required null seeking characteristic. The resonant frequency of the solid inertial element 10 on its support 11 is very low, and may be represented to be well below $f_2$ in FIG. 6. The amplitude response portion of the plot of FIG. 6 shows the ratio of angular output to angular input, or $\theta_o$ to $\theta_i$. The amplitude response for angular displacement of the inertial mass 10 begins at some low value and climbs at plus 12 db per octave to unity at a frequency well below $f_2$. The phase response of solid inertial element 10 is also seen in FIG. 6 to provide less than 5° phase error above $f_2$. At frequencies above $f_2$, therefore, the solid inertial element 10 operates as an angular displacement transducer with minimal phase and amplitude error.

Figure 7:
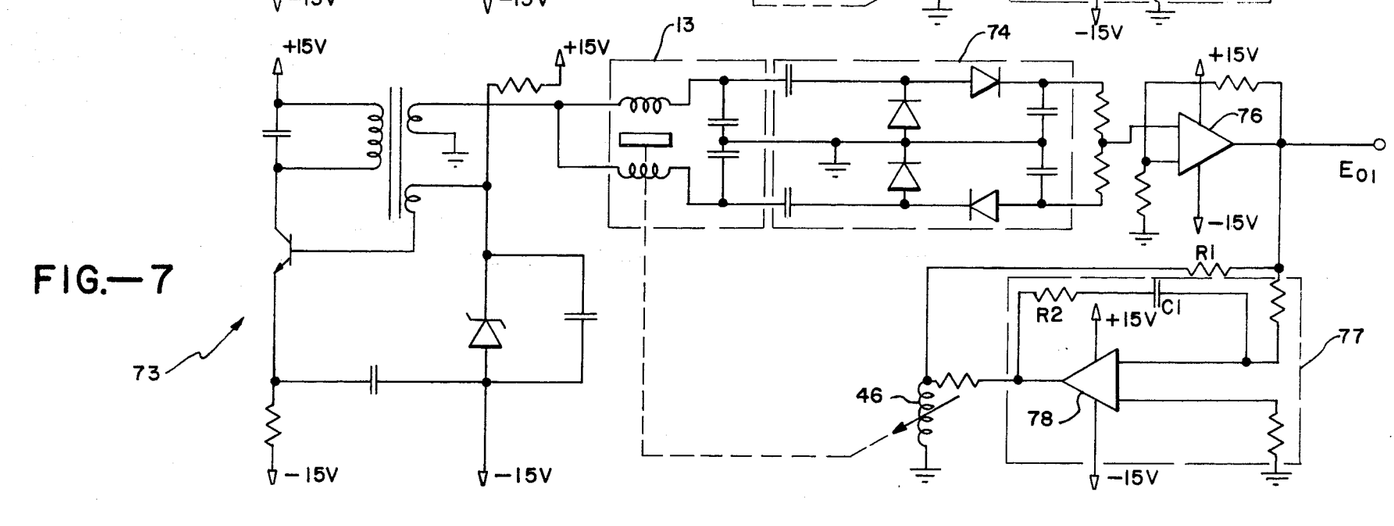
FIG. 7 is an electrical schematic of the solid inertial element angular displacement sensor.

The manner in which the torque is obtained to urge mass 10 toward a neutral position for steady state inputs, and to obtain the response characteristics shown in FIG. 6 may be seen by reference to FIG. 7. An oscillator section 73 is provided for exciting pickoff 13 which provides an output signal to a low noise circuit 74 which is described in co-pending application Ser. No. 307,110 filed Nov. 16, 1972. The output of low noise circuit 74 is delivered to the input of an amplifier 76 which provides a low frequency angular displacement output labeled $E_{01}$. The feedback path around pickoff 13 has two parallel paths. The first path provides positive feedback through a resistor R1 which is connected to torquer 46. This positive feedback tends to torque mass 10 away from a neutral position. The positive feedback signal is adjustable by adjusting the magnitude of the resistor R1 to provide the remaining "negative spring torque" which is not supplied mechanically by taut wire 41 to match the return torque in spring support 11. The other parallel path has an averaging circuit 77 which provides negative feedback tending to recenter the inertial mass 10. Averaging circuit 77 differs from the usual negative feedback element found in a force balance mechanism, in that more is accomplished than mere phase inversion of the feedback signal before delivery to the torquer 46 for recentering mass 10.

Averaging circuit 77 has an amplifier 78 which has an averaging or an integrating function. The loop around the amplifier 78 has a series resistor R2 and capacitor C1 combination. A signal appearing at the input of amplifier 78 which is steady state will provide a large amplifier output because the gain approaches infinity since the feedback impedance approaches infinity due to series capacitor C1. An oscillatory input to amplifier 78 reduces the gain as the feedback path impedance decreases and the loop around the pickoff 13 is "softened." Slowly changing or stable inputs presented to averaging circuit 77 in the feedback loop around pickoff 13 provide a "tighter" loop. Stated another way, for $E_{01}$ changes approaching infinitely high frequencies, there would be low gain in amplifier 78 which provides recentering of mass 10 slowly. For $E_{01}$ changes approaching steady state the gain of amplifier 78 would rise providing a stiff feedback loop around pickoff 13 to recenter mass 10 in an immediate and positive manner.

Inertial element 10, while having a very low resonant frequency about the sensitive axis X as seen in FIGS. 3 and 4 may produce resonant frequencies well above the frequency $f_2$ for vibrational modes about axes other than the X axis. The output produced by angular displacement pickoff 13 must therefore be cut off at some high cut off frequency piror to the occurence of the aforementioned resonant modes to preclude spurious information from being generated by pickoff 13. Low pass filter 36 performs this function with a high cut off frequency of approximately $f_1$ as seen in FIG. 6.

The fluid inertial element 25 construction is similar to that disclosed in U.S. Pat. No. 3,520,196. The pickoff feedback centering circuit 31 however differs in major respect. The characteristic time of feedback circuit 31 is purposely made to be long for angular displacements at frequencies within the band of interest. Correspondingly, the characteristic time of feedback circuit 31 is short for angular displacement at frequencies below the band of interest. The paddle 55 is shown in FIG. 3 as sufficiently spaced from the inside walls of case 54 to provide substantially complete decoupling therefrom through fluid 53.

A conventional force balance angular accelerometer with 30 Hertz band width, for example, to be converted to an angular displacement sensor with a band width from 1 Hertz upward, would require at lease a 900:1 reduction in force balance loop gain, or an approximate reduction in loop gain of 1000:1. For an unbalance signal due to moving system unbalance in the angular accelerometer of 5 millivolts per g with a 5 kilohm feedback resistor in the force balance loop, a reduction of 1000:1 in gain would require a 5 megohm feedback resistor. The unbalance signal would now be 5 volts per g for the same degree of moving system unbalance. This is certainly not practical because most full scale outputs are 5 volts or less. The same problem would exist for zero offset errors or any other moving system error torques besides mass unbalance; i.e. fluid flow due to density gradients in the fluid caused by fluid temperature gradients. Since the error output approaches full scale as the force balance loop gain is decreased, it is apparent that reduction of angular accelerometer sensitivity band width to obtain angular displacement sensor performance is attainable in theory only. A perfect angular accelerometer would be required which is not attainable. A real angular accelerometer with real error sources, however small, would not be acceptable or modifiable to perform the function of an angular displacement sensor.

Referring to the amplitude response portion of FIG. 6 the ratio of fluid rotor angular output indication to angular input is seen to climb to unity or zero db at a frequency well below frequency $f_1$. This signifies that at frequencies above $f_1$ the fluid inertial element and the pickoff centering feedback circuit cease to act as an angular acceleration sensing device and function instead as an angular displacement transducer. The response characteristics of pickoff centering feedback circuit 31 are so slow that the pickoff moving element 29 substantially floats within and moves with the fluid inertial element 25 for all frequencies above frequency $f_1$. Fluid inertial element 25 has no significant secondary modes of vibration responsive to input frequencies above $f_1$, and it is therefore substantially amplitude error-free at frequencies above $f_1$.

Figure 8:
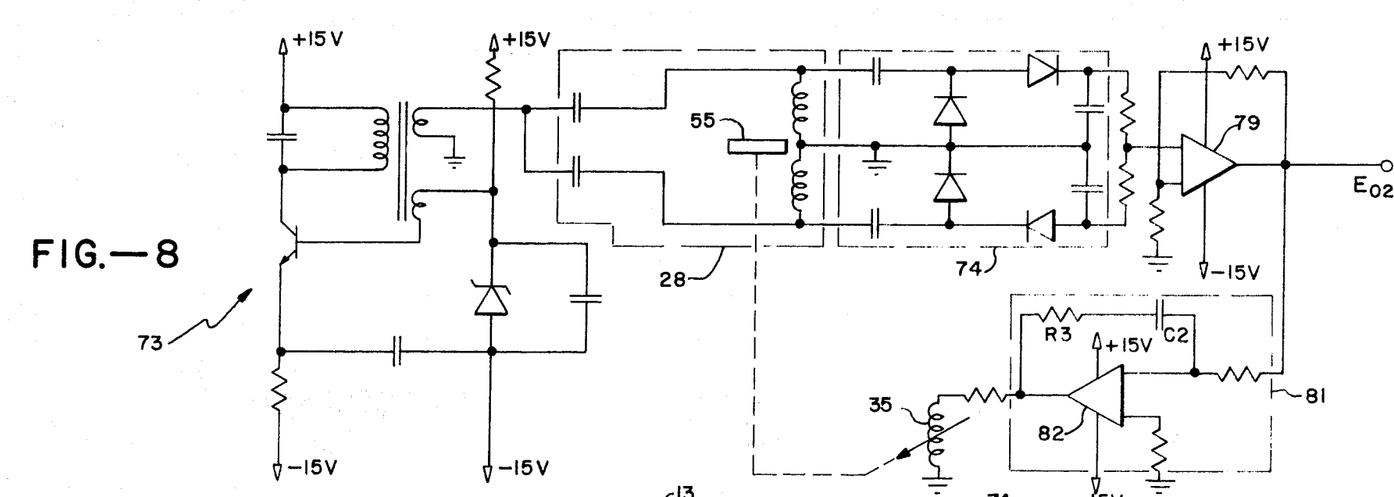
FIG. 8 is an electrical schematic of the fluid inertial element angular displacement sensor.

In the case of the sensor containing the fluid mass 25, paddle 55 seen in FIG. 5 is positioned within the fluid mass. The paddle 55 is intentionally decoupled from the walls of case 54 which encloses the angular displacement sensor and the fluid mass 25 in the embodiment providing an angular displacement sensor. Referring to FIG. 8, a tuned pickoff 28 is excited by oscillating section 73. Pickoff 28 provides an output which is delivered to low noise section 74 which prepares the signal for presentation to the input of amplifier 79. Amplifier 79 provides an output $E_{02}$ from the angular displacement sensor utilizing fluid inertial element 25 which is delivered to the input of averaging circuit 81 in the feedback loop around pickoff 28. Averaging circuit 81 has an amplifier 82 with a feedback loop from output to input containing a resistor R3 and a capacitor C2. The output of averaging circuit 81 is provided to torquer 35 for positioning the moving element, paddle 55, in tuned pickoff 28.

Pickoff 28 is operating open loop in the frequency band of interest, and the paddle 55 on the moving system is no longer sensitive to the mass inertia of the fluid mass 25. Therefore, the smallest size fluid path 52 may be used commensurate with providing a fluid mass 55 which is sufficiently decoupled from the enclosing support walls of case 54 and path 52. The paddle 55 is no longer sensitive to the torqueing constant of torquer 35 in the frequency band of interest, since it operates open loop in that band.

Fluid inertial element 25 is not desirable as an angular displacement transducer element below frequency $f_1$ due to temperature effects and due to the increased viscous coupling between the walls of the fluid inertial element path 52 and the fluid element 25. At frequencies below $f_1$ the fluid element 25 incurs errors in phase and amplitude response either through temperature effects or through viscous coupling with the walls and tends to move in the direction of the wall motion. These characteristics are undesirable since the walls are mounted directly on support base 12 which carries the neutral reference for both inertial elements 10 and 25. The paddle 55 seen in FIG. 5 has loose coupling with the inside walls of case 54 and the walls of fluid inertial element pah 52.

The automatic centering loop in the disclosed combination provides for centering of the moving systems by placing an averaging circuit in the force balance loop. Zero offset and error torques, being steady state signals, are removed from the output of both solid and inertial element angular displacement sensors by their respective averaging circuits. Oscillatory inputs above $f_2$ in FIG. 6 provide an output from the solid inertial element angular displacement sensor which has minimal phase and amplitude error. Oscillatory inputs above $f_1$ in FIG. 6 provide an output from the fluid element angular displacement sensor which has minimal phase and amplitude error. By way of example, FIG. 6 shows a worst case error of 5° in each type of instrument. Such a phase error causes a 10° percent output error. Viewing this from another aspect, a corrective signal may be generated which may be used to realize a 10:1 reduction in oscillatory noise when applied to a signal containing the noise caused by the oscillatory input.

Substantially all of the angular displacement information below frequency $f_1$ is provided by angular displacement pickoff 13 associated with solid inertial element 10. Low pass filter 36 blocks signals from pickoff 13 above $f_1$. Substantially all of the angular displacement information above frequency $f_1$ is provided by angular displacement pickoff 28 associated with fluid inertial element 25. High pass filter 37 blocks signals from pickoff 28 below $f_1$. Either displacement sensor may be used separately within its own bandwidth of response to angular displacement. For example, in applications requiring displacement sensing from approximately 1 hertz upward the fluid inertial element sensor may be used by itself. Conversely, for applications requiring displacement sensing from near zero to one or two hertz the solid inertial element may be used by itself.

It should be noted that an additional pickoff, similar to pickoff 28 having an additional movable element similar to element 29, could be mounted in the angular position occupied by paddle 55. Paddle 55, still connected to movable element 29, could then be disposed in path 52 at some other angle. In this fashion the pickoffs could be connected to aid one another with angular motion of the movable elements, so that linear acceleration causing output from the pickoffs would cancel.

The angular displacement transducer disclosed herein may be used as a sensing element in a control system as well as a monotoring transducer for angular displacement. As an example it is sometimes necessary to remove the angular jitter of a television camera from a particular nominal sighting line. During movement of the camera the visible presentation may become fuzzy due to variations from a constant angular velocity of movement. In such a situation angular displacement indications from the set of coordinates moving at a constant velocity are attainable from the angular displacement transducer due to the aforementioned frequency response characteristics. A televison camera during motion with an angular displacement transducer coupled about the axis of camera rotation will sense high and low frequencies of displacement from the moving coordinate system which may be fed back to the vertical and horizontal deflection yokes in the television sytem to precisely cancel out the jitter or angular aberrations in the motion of the camera.

In a control application as described in the previous paragraph phase error becomes an important consideration. It is required that the signal being fed into the compensation coils for the vertical and horizontal yokes remain in exact synchronism with the mechanical motion. This means there should be 0° phase shift between mechanical deflection of the camera lens assembly and the electrical output of the angular displacement sensor. A nominally infinite bandwidth system is required to meet this requirement. The angular displacement transducer disclosed herein meets this requirement for practical purposes. As seen in FIG. 6 depicting one embodiment of the invention, the phase response of the fluid inertial element 25 remains well within 6° of synchronism for the frequency band extending from $f_1$ to $f_3$ as determined from experimental data. A dashed phase response curve in FIG. 6 shows a worst case situation for the fluid rotor occurring due to temperature effects. The phase shift derived from the solid inertial element 10 and related circuitry is also seen to remain within 6° of synchronism over the frequency band from $f_2$ to $f_1$. A phase shift of 6° is the equivalent of 10 percent error. Implementation of control utilizing the angular displacement transducer disclosed here will therefore provide a minimum ten to one improvement in television video presentation by bringing the video presentation to within 6° worst case of any variation in angular panning velocity of the camera. It is immediately apparent to one skilled in the art that this is not possible by other means over the bandwidth of 0.1Hz to 100Hz, for example, with a normal linear second order angular displacement sensor.

Figure 9:
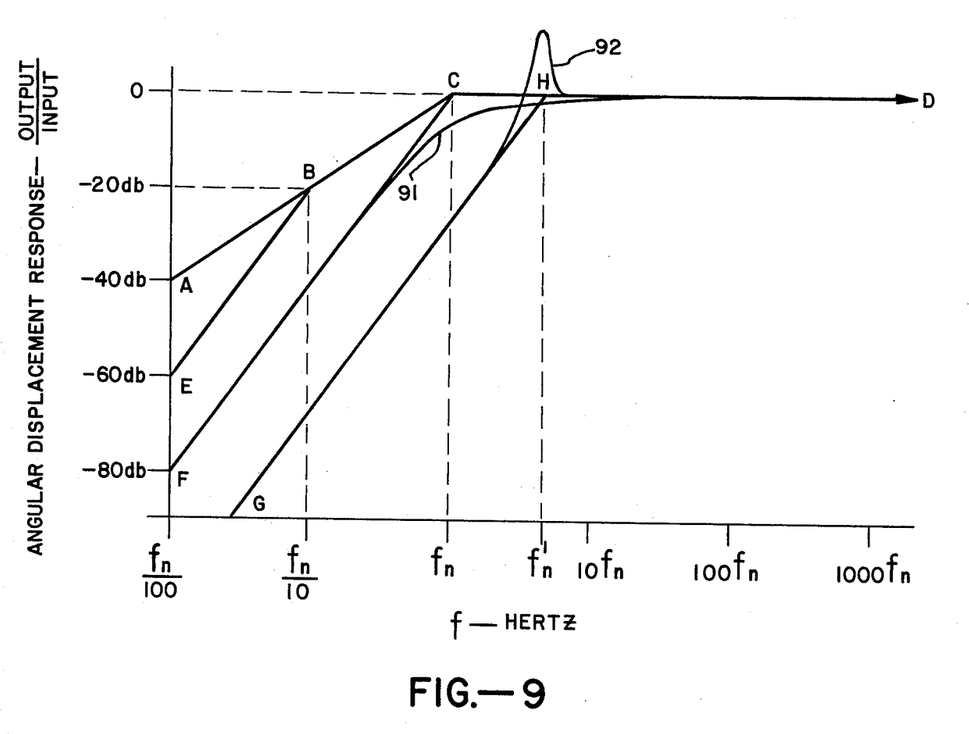
FIG. 9 is an amplitude response diagram for the angular displacement transducer embodiment.

Referring to FIG. 9, a diagram is shown illustrating response to constant amplitude sinusoidal angular displacement inputs to the disclosed angular motion transducer. It should be noted that in theory the individual solid and fluid inertial mass sensors will provide response as shown in FIG. 9. From a practical standpoint, however, the following discussion alludes to the sensor containing th fluid inertial mass since the sensor containing the solid inertial mass is subject to output signal errors resulting from internal structural resonance at harmonic frequencies. Curve ABCD in FIG. 9, shows the open loop angular displacement response to constant sinusoidal angular displacement inputs where the point C on the curve represents a pole at which the viscous shear forces within the fluid mass equal the inertial torques provided by the fluid mass. Restated, damping torque is equivalent to inertial torque at point C which, therefor, represents the mechanical pole of the open loop system. The line ABC and the line CD repesent the asymptotes of the actual response curve with the line ABC rising at the rate of 6 db per octave.

Turning now to the curve represented by EBCD in FIG. 9, the line EB is shown rising at a rate of 12 db per octave to point B. Point B represents the electrical pole or servo induced pole in the system imposed by the centering feedback circuit 31. The servo induced pole may be moved to the right in FIG. 9 by increasing the gain of servo amplifier 34 of FIG. 1. Curve FCD shows the case where the servo induced pole and the pole arising from mechanical interaction within the transducer are coincident. Curve 91 is the actual response curve and depicts a damping ratio of 1 wherein the amplitude response at the natural frequency of the system is down 6 db.

By increasing the gain of amplifier 34 and centering feedback loop 31 even further, the electrical pole may be moved to the position designated H in FIG. 9 and the asymptotes for angular displacement response are now represented by lines GH and HD. Actual response is shown by curve 92 which shows an underdamped system controlled by the damping imposed by centering feedback means 31. The natural frequency of the system has now been moved to the right to occupy the position indicated by $f_n$.

Figure 10:
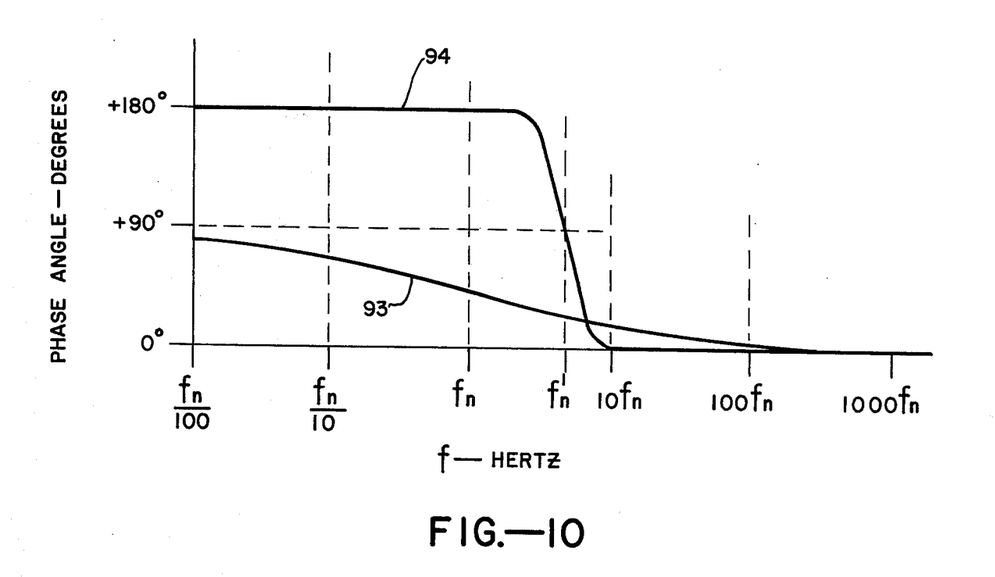
FIG. 10 is a phase response diagram for the angular displacement transducer embodiment.

The purpose being accomplished by raising the gain of amplifier 34 to place the servo induced or electrical pole at point H in FIG. 9 is to provide a sensor which is not limited in recovery time by the mechanical effects of the viscosity of the fluid inertial element. As may be seen in FIG. 9 at the point in the bandwidth indicated by $10f_n$ the amplitude response error is nil. An equally important purpose is to reduce phase angle error as may be seen by referring to FIG. 10. Phase response for the curve ABCD in FIG. 9 is shown by curve 93 in FIG. 10. Phase response for the curve GHD in FIG. 9 is shown by the curve 94 in FIG. 10. Curve 93 is the result of single pole damping induced by the pole located at point C in FIG. 9. The underdamped situation created by raising the gain of the centering feedback means to place the servo induced pole at point H in FIG. 9 results in the phase response curve 94 which may be seen to be nominally at 0° at a frequency equivalent to $10f_n$. Phase error as indicated by curve 93 for the single pole damped sensor is still in the neighborhood of 6° at $10f_n$ in FIG. 10. It is apparent that judicious adjustment of the gain in the centering feedback circuit 31 may be used for reducing amplitude and phase error in a bandwidth above the frequency $f_n$, in this case beginning at approximately $10f_n$.

The importance of keeping the error signals down is apparent when it is realized that operational amplifiers are now available with input noise equivalent to one micro-volt. When such an amplifier is connected to the low noise circuit 74 a remarkable sensitivity level is attained. Pickoff sensitivity may be 0.5 volts per milli-inch of pickoff paddle motion. This is 500 millivolts per milli-radian at a 1 inch radius on the paddle in the moving system. This represents 500 micro-volts per micro-radian, which means that the noise in the signal output will approach the equivalent of 1/500 of micro-radian. That is two nano-radians which is equivalent to an azimuth error of less than a foot over a distance from San Francisco to New York.

Figure 11:
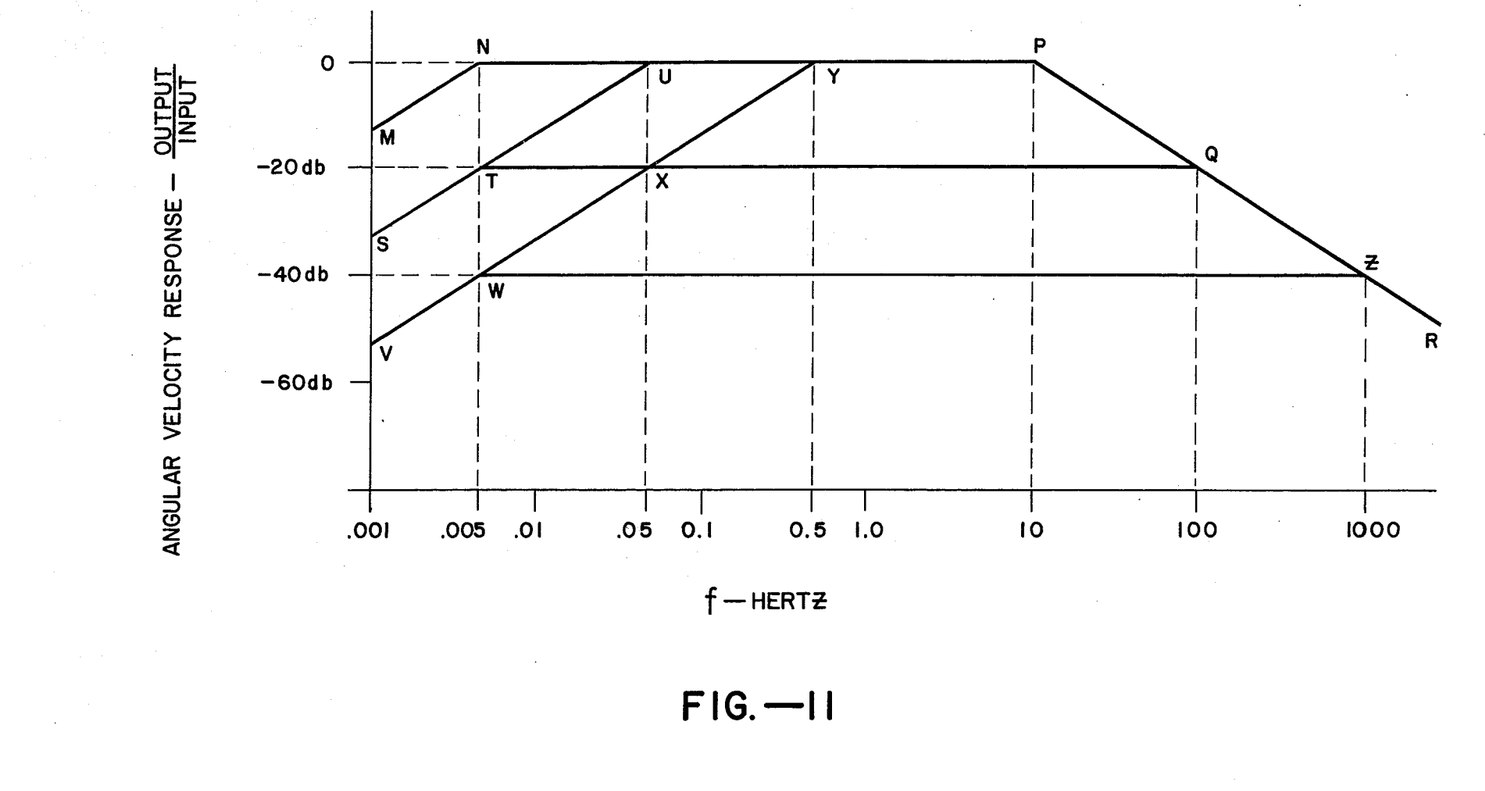
FIG. 11 is an amplitude response diagram for the angular velocity transducer embodiment.

The function of another embodiment of the present invention may be seen in FIG. 11. As noted heretofore the angular motion sensor containing the solid inertial element will function in theory according to the angular velocity response of FIG. 11 as well as the angular motion sensor containing the fluid inertial element. Once again, harmonic resonance points exist in the solid inertial element sensor structure which render it impractical as a sensor for providing response indicated in FIG. 11. Therefore, the discussion is directed to the angular motion sensor containing the fluid inertial element and response is therefore shown for the sensor of FIG. 5 for purposes of illustration. The frequency scale of FIG. 11 is also shown for purposes of illustration and is merely representative of functional characteristics which may be obtained by proper adjustment of centering feedback loop electrical characteristics and fluid material mass sensor mechanical characteristics.

A linear second order system having a centering feedback loop and viscous damping may respond to angular velocity inputs as shown in FIG. 11. The curve therein designated MNPR has a servo induced pole at point N and a mechanically induced pole at point P. The gain of the centering feedback loop 31 is adjusted to cause a 6 db per octave rise in response to 0.005 hertz at which time the response asymptote remains flat until 10 hertz whereupon the mechanically induced pole causes a 6 db per octave roll off.

The response characteristic described above for angular velocity inputs may be adjusted in a variety of ways. By increasing the gain in centering feedback loop 31 the servo induced pole may be positioned at point U providing a response curve described by SUPR, or it may be increased even further to position the servo induced pole at point Y providing asymptotes to the response curve described by VYPR. In these latter two instances it may be seen that the bandwidth for flat angular velocity response extends between 0.05 and 10 hertz and 0.5 and 10 hertz respectively.

Movement of the mechanical pole may also be utilized to shape the angular velocity response as follows. It is assumed that once a fluid mass having a particular viscosity is selected it will either be operated in an environment having a constant temperature or will be heated to a temperature at which environmental temperature variations will not affect the fluid mass temperature. With this assumption in mind and again referring to the response curve VYPR it may be seen that an increase in fluid inertial mass viscosity may place the mechanically induced pole at point Q. In such a case the asymptotes for the response curve will be defined by VXQR. The amplitude response has been decreased by 20 db for purposes of illustration in FIG. 11, and the bandwidth of interest has been increased to include 0.05 hertz to 100 hertz. The extremely fine sensitivity described heretofore allows movement of the mechanically induced pole upward in frequency as a design choice while still allowing a noise-free amplified output signal sufficient for monitoring or control purposes.

The extreme sensitivity available in the disclosed motion sensor allows further increase in viscosity until the response curve is described by the asymptotes VWZR. As may be seen in FIG. 11 the bandwidth has now been increased to 0.005 hertz to 1,000 hertz while still providing noise-free signals at sufficient amplitude for control or monitoring purposes.

The mechanically induced pole may be moved to the right in FIG. 11 while decreasing amplitude response by increasing the coupling between paddle 55 and structure fixed to support base 12. There exist, therefore, three methods of varying the position of the mechanically induced pole. The stable temperature of the fluid inertial mass may be controlled at various levels, the viscosity of the fluid inertial mass may be a predetermined value, and the coupling between the paddle 55 and the structure fixed to support base 12 may be varied to provide lesser or greater viscous shear forces. An angular velocity transducer has therefore been disclosed with an adjustable flat response bandwidth utilizing the same structure disclosed heretofore for the fluid inertial element angular motion sensor typified in FIG. 5.

Another application for the angular motion transducer in a control system exists in the maintenance of a centrifuge at a predetermined angular velocity. Deviations from constant angular speed in the rotating coordinate system aligned with the centrifuge arm are detected by the angular displacement transducer, fed back to the prime mover for the centrifuge, and corrective motor forces generated to cancel variations from a constant angular velocity.

An angular motion transducer has been disclosed which may be used to monitor angular motion within a coordinate system to which it is referenced, or which may be used to control angular motion within a coordinate system to which it may be referenced. Using both low and high frequency motion sensors, together or either sensor individually, amplitude response and phase response errors are minimal over a bandwidth which is not attainable by an ordinary linear second order angular motion sensitive system. The angular motion transducer disclosed herein is suitable for monitoring or control of angular motion over the bandwidth of 0.1 to 1,000 hertz, for example, with acceptable amplitude and phase response errors. Angular sensitivity down to 0.001 arc seconds with an output of 4 volts DC per arc second is attainable. These bandwidth and sensitivity characteristics make the disclosed angular motion transducer immediately desirable for seismological measurements as well as those mentioned heretofore.

I claim:

1. In a transducer for detecting angular displacement about a sensitive axis having a support base and an external reference indicating orientation of the sensitive axis, a solid inertial element movable relative to said support base about the sensitive axis, means for supporting said solid inertial element on said base allowing motion about the sensitive axis, a first pickoff disposed between said solid inertial element and said base for providing a first output signal, first pickoff centering feedback means receiving said first output signal for urging said solid inertial element toward a substantially neutral position relative to said base, a fluid inertial element movable relative to said base about the sensitive axis, a second pickoff having a moving member in communication with said fluid inertial element and a stationary member mounted on said support base for providing a second output signal, second pickoff centering feedback means receiving said second output signal for urging said moving member toward a substantially neutral position relative to said base, a low pass filter for receiving said first output signal and producing output related to low frequency angular displacements, a high pass filter for receiving said second output signal and producing output related to high frequency angular displacements, and summing means for combining the outputs of said low and high pass filters and producing output related to angular displacement through the low and the high frequency spectrum.

2. A transducer for detecting angular displacement about a sensitive axis as in claim 1 wherein said first pickoff centering feedback means comprises an amplifier for receiving said first output signal, an amplifier response circuit connected to said amplifier for determining the closed loop response of said first pickoff centering feedback means, and a torque producing device for receiving the output of said amplifier, said torque producing device operating to urge said solid inertial element toward the substantially neutral position.

3. A transducer for detecting angular displacement about a sensitive axis as in claim 2 wherein said means for supporting said solid inertial element provides a positive return torque urging said inertial element toward said substantially neutral position when displaced through an angle about the sensitive type, together with electronic trim means for connecting a portion of said first output signal to said torque producing device for urging said inertial element away from said substantially neutral position when displaced through an angle about the sensitive axis, said electronic trim means operating to provide a negative torque substantially equal to the positive return torque.

4. A transducer for detecting angular displacement about a sensitive axis as in claim 2 wherein said means for supporting said solid inertial element provides a positive return torque urging said inertial element toward said substantially neutral position when displaced through an angle about the sensitive axis.

5. A transducer for detecting angular displacement about a sensitive axis as in claim 1 wherein said second pickoff centering feedback means comprises an amplifier for receiving said second output signal, an amplifier response circuit connected to said amplifier for determining the closed loop response of said second pickoff centering feedback means, a torquer for receiving the output of said amplifier for urging said second pickoff moving member toward the substantially neutral position whereby said fluid inertial element is urged in the direction of angular rotation of the support base, said amplifier response circuit operating to provide fluid inertial element response with characteristic time longer than the period of the low cut off frequency of said high pass filter.

6. An angular displacement transducer for monitoring displacement about a sensitive axis, comprising a support base for mounting the transducer in alignment with the axis being monitored, a fluid inertial element movable relative to said base about said sensitive axis, pickoff means disposed between said fluid inertial element and said base providing output related to displacement therebetween, a centering feedback circuit for receiving output from said pickoff means urging said fluid inertial element toward a neutral reference relative to said base, said centering feedback means having a characteristic time which is longer than the period of an upper frequency, whereby said fluid inertial element is urged by said centering feedback circuit toward said neutral reference position at a slow rate so that said output is related to angular displacement of said base at input frequencies above said upper frequency, together with a solid inertial element movable relative to said support base about the sensitive axis, means disposed between said solid inertial element and said support base for providing an additional output signal related to said solid element angular position relative to said support base, and additional centering feedback circuit for receiving said additional output signal for urging said solid inertial element toward a substantially neutral position relative to said support base, said additional centering feedback circuit having a characteristic time which is longer than the period of a lower frequency whereby said solid inertial element is urged by said additional centering feedbck circuit toward said substantially neutral position at a slow rate so that said additional output is related to angular displacement of said base at input frequencies between said lower frequency and said upper frequency.

7. An angular displacement transducer as in claim 6 together with spring support means for supporting said solid inertial element on said support base having a positive spring torque urging said solid inertial element toward said neutral position when angularly displaced therefrom, and means for providing a negative spring torque about the sensitive axis disposed between said support base and said solid inertial element for substantially cancelling said positive spring torque.

8. An angular displacement transducer as in claim 7 together with feedback means for providing a portion of said additional output signal to said additional centering feedback circuit, said portion of additional output signal operating to electrically negate residual positive spring torque.

9. An angular displacement transducer for monitoring displacement about a sensitive axis comprising a supporting base for mounting the transducer in alignment with the axis being monitored, a solid inertial element movable relative to said base about said sensitive axis, position sensing means disposed between said solid inertial element and said supporting base for providing output signal related to solid element angular position relative to said supporting base, a centering feedback circuit for receiving said output signal and urging said solid inertial element toward a substantially neutral position relative to said supporting base, said centering feedback circuit having a characteristic time which is longer than the period of a predetermined frequency, whereby said output signal is indicative of angular displacement of said supporting base about the sensitive axis for input frequencies above said predetermined frequency, pivot means for mounting said solid inertial element relative to said base, said pivot means providing a positive return torque urging said inertial material element toward said substantially neutral position and means for mechanically providing a negative torque about the sensitive axis for substantially cancelling said positive return torque.

10. An angular displacement transducer as in claim 9 wherein said centering feedback circuit comprises an amplifier for receiving said output signal, an amplifier response circuit for providing said characteristic time and means for torquing said solid inertial element about the sensitive axis, and wherein said means for providing a negative torque comprises a negative spring disposed between said solid inertial element and said support base for urging said solid inertial element away from said substantially neutral position when displaced angularly therefrom, and electric trim means for connecting a portion of said output signal to said means for producing torque for torquing said solid inertial element away from said substantially neutral position when displayed angularly therefrom.

11. A method for sensing angular displacement of a member about a sensitive axis in a low frequency band with minimal phase and amplitude response error, comprising the steps of mounting a solid inertial mass on the member for rotation about the sensitive axis, restraining rotation of the solid inertial mass with a positive torsional spring, detecting the relative motion between the member and the solid inertial mass when the member is rotated about the sensitive axis, and providing a signal indicative thereof, torquing the solid inertial mass in the direction of member motion by providing a torque related to the relative motion, introducing a long time constant in the torquing response, negating mechanically the positive torsional spring with a negative torque substantially equal to torque restraining rotation thereby obtaining a low sensitive axis rotational resonance of the mounted solid inertial mass and a measure of displacement of the member relative to the solid inertial element for input frequencies higher than the rotational resonance.

12. A method for sensing angular displacement as in claim 11 wherein the step of negating the positive torsional spring comprises the steps of enhancing rotation of the solid inertial mass with a negative torsional spring, trimming the signal indicative of relative motion, and aiding the negative torsional spring by torquing the solid inertial mass opposite to the direction of member motion with the trimmed signal.

13. A method for sensing angular displacement of a member about a sensitive axis over a wide frequency band with minimal phase and amplitude response error comprising the steps of mounting a fluid container on the member, disposing a fluid mass in the container for movement about an axis parallel to the sensitive axis, detecting the relative motion between the container and the fluid mass when the member is rotated about the sensitive axis, and providing a signal indicative thereof, torquing the fluid mass in the direction of member motion by providing a torque related to the relative motion therebetween, introducing a long time constant in the fluid mass torquing response, thereby obtaining a measure of displacement of the member relative to the fluid mass for input frequencies with periods shorter than the fluid mass torquing responses, mounting a solid inertial mass on the member for movement about the sensitive axis, restraining rotation of the solid inertial mass with a positive torsional spring, detecting the relative motion between the member and the solid inertial mass when the member is rotated about the sensitive axis and providing a signal indicative thereof, torquing the solid inertial mass in the direction of member motion by providing a torque related to the relative motion therebetween, introducing a longer time constant in the solid inertial mass torquing response than in the fluid mass torquing response, negating the positive torsional spring with a negative torque substantially equal to torque restraining rotation thereby obtaining a sensitive axis period of rotational resonance longer than the fluid mass torquing response and a measure of displacement of the member relative to the solid material mass for input frequencies having periods shorter than the sensitive axis period of rotational resonance and longer than the fluid mass torquing response.

14. A method as in claim 13 together with the steps of filtering the signal indicative of relative motion between the container and the fluid mass to eliminate signal frequencies with periods longer than the fluid mass torquing responses, filtering the signal indicative of relative motion between the member and the solid inertial mass to eliminate signal frequencies with periods shorter than the fluid mass torquing response and longer than the period of rotational resonance, and combining the filtered signals thereby obtaining a single measure of displacement of the member relative to an inertial reference for displacement input frequencies with periods shorter than the period of solid inertial mass rotational resonance.

15. A method for sensing angular displacement as in claim 13 wherein the step of negating the positive torsional spring comprises the steps of enhancing rotation of the solid inertial mass with a negative torsional spring, trimming the signal indicative of relative motion and aiding the negative torsional spring by torquing the solid inertial mass opposite to the direction of member motion with the trimmed signal.

16. In a wide band angular displacement transducer having a sensitive axis, a support base, a first inertial element mounted on said support base and movable relative thereto about the sensitive axis, first pickoff means for sensing displacement between said first inertial element and said support base and providing a first electrical output signal, first means for receiving said first electrical output signal for urging said first inertial element toward a substantially neutral position relative to said support base for first electrical output signals below a first frequency, a second inertial element mounted on said support base and movable relative to said support base about the sensitive axis, second pickoff means for sensing displacement between said second inertial element and said support base and providing a second electrical output, second means for receiving said second electrical output signal for urging said second inertial element toward a substantially neutral position relative to said support base for second electrical output signals below a second frequency which is higher than said first frequency, and means for combining said first and second electrical outputs, whereby a combined output is produced which is related to angular displacement of said support base for the band width above said first frequency.

17. A wide band angular displacement transducer as in claim 16 wherein said first means for receiving said first electrical output signal comprises an amplifier, an averaging circuit connected to said amplifier for determining the closed loop response of said first means as a function of first electrical output signal frequency, and a torque producing device for receiving the output of said amplifier and providing torque between said support base and said first inertial element.

18. A wide band angular displacement transducer as in claim 17 together with means for supporting said first inertial element, said means for supporting providing a positive return torque for urging said inertial element towards said substantially neutral position when said support base is displaced through an angle about said sensitive axis, and electronic trim means for connecting a predetermined part of said first output signal to said torque producing device for urging said first inertial element away from said substantially neutral position about said sensitive axis, so that said electronic trim means may provide a negative torque adjustable to substantially equal said positive return torque.

19. A wide band angular displacement transducer as in claim 17 together with means for supporting said first inertial element providing a positive return torque urging said first inertial element towards said substantially neutral position when displaced about said sensitive axis, and means for providing a negative torque about the sensitive axis for substantially cancelling said positive return torque.

20. A wide band angular displacement transducer as in claim 16 wherein said second means for receiving said second electrical output signal comprises an amplifier, an amplifier response circuit connected thereto for determining the closed loop response of said second means as a function of second electrical output signal frequency, torquing means for receiving the output of said amplifier and for providing torque between said support base and said second inertial element, whereby said second inertial element is urged in the direction of angular displacement of said support base for second electrical output signals below said second frequency and is substantially free of torque from said torquing means for second electrical output signals above said second frequency.

21. A wide band angular displacement transducer as in claim 16 together with a low pass filter for receiving said first output signal having a pass band below said second frequency, and a high pass filter for receiving said second output signal having a pass band above said second frequency.

22. A wide band angular displacement transducer as in claim 16 wherein said first inertial element is in the form of a solid having a residue of gyration about said sensitive axis, and wherein said second inertial element is in the form of a fluid having a radius of gyration about said sensitive axis.

23. An angular displacement transducer having a sensitive axis comprising a support base, means for containing a fluid mass mounted on said support base, a fluid inertial element movable relative to said support base about said sensitive axis and positioned within said means for containing a fluid mass, pickoff means disposed between said fluid inertial element and said support base providing output related to displacement therebetween, said pickoff means including a movable element positioned within said fluid inertial element, an averaging circuit for receiving said output from said pickoff means, said averaging circuit having a characteristic time and providing a movable element centering output related to the average value of said output from said pickoff means, means connected to receive said movable element centering output for urging said movable element toward a neutral reference position relative to said support base, with a force dependent upon the magnitude of said movable element centering output, said movable element centering output magnitude being great for pickoff output frequencies below a predetermined frequency and approaching zero thereby allowing free motion of said fluid inertial element and said movable element relative to said support base for pickoff output frequencies above said predetermined frequency, whereby said output from said pickoff means is forced toward zero output in a time period related to said characteristic time.

24. An angular displacement transducer as in claim 23 where said averaging circuit comprises an amplifier, a feedback loop around said amplifier providing high amplifier gain for pickoff output frequencies below said predetermined frequency and providing for low amplifier gain for pickoff output frequencies above said predetermined frequency, and said means for urging comprises a torque generator for providing torque to said moving element in said pickoff means.

25. An angular displacement transducer as in claim 23 wherein said means for containing a fluid mass comprises a continuous path.

26. An angular displacement transducer as in claim 25 together with an additional pickoff means connected to aid said pickoff means output, and an additional movable element included therein attached to said movable element and positioned within said fluid inertial element in a position opposite the position of said movable element, whereby output error from linear acceleration may be cancelled by summing the outputs of said pickoff and said additional pickoff.

27. A method for sensing angular displacement of a body about a sensitive axis comprising the steps of mounting a container for a fluid mass on the body, disposing a fluid mass in the container for movement about a sensitive axis, detecting the relative motion between the container and the fluid mass when the body is rotated about the sensitive axis, averaging the detected relative motion between the container and the fluid mass over a predetermined time, generating a torque related to the average detected relative motion over the predetermined time, applying the torque to the fluid mass in the direction of body rotation, whereby the average displacement of the fluid mass from a rotation reference on the body is forced to zero in the predetermined time for body rotation frequencies below a predetermined frequency, and the fluid mass is allowed to move freely relative to the rotation reference for body rotation frequencies above the predetermined frequency.

28. An angular velocity transducer for sensing and providing indication of angular velocity over a bandwidth extending from a lower frequency to an upper frequency comprising a support base, a fluid inertial element having a predetermined viscosity and being movable relative to said support base, means for supporting said fluid inertial element on said support base, pickoff means mounted on said support base and having a moving member in communication with said fluid inertial element for providing an output signal, means for receiving and for averaging said output signal over a characteristic time period, means responsive to said average output signal for urging said moving member toward a substantially neutral position relative to said support base with said characteristic time period, said means for averaging operating to define said lower frequency and said predetermined viscosity operating to define said upper frequency.

29. An angular velocity transducer as in claim 28 together with means for adjusting the gain of said means for averaging, whereby said lower frequency is adjusted.

30. An angular velocity transducer as in claim 28 together with heater means for adjusting said fluid inertial element to maintain a predetermined stable temperature, whereby said upper frequency is adjusted.

* * * * *